US010180596B2

(12) United States Patent
Kim et al.

(10) Patent No.: US 10,180,596 B2
(45) Date of Patent: Jan. 15, 2019

(54) DISPLAY APPARATUS

(71) Applicant: SAMSUNG ELECTRONICS CO., LTD., Suwon-si (KR)

(72) Inventors: Young Chul Kim, Suwon-si (KR); Joon Seok Ahn, Suwon-si (KR); Heong Seog Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 45 days.

(21) Appl. No.: 15/014,528

(22) Filed: Feb. 3, 2016

(65) Prior Publication Data

US 2016/0223867 A1   Aug. 4, 2016

Related U.S. Application Data

(60) Provisional application No. 62/111,259, filed on Feb. 3, 2015.

(30) Foreign Application Priority Data

Dec. 11, 2015   (KR) .................. 10-2015-0177106

(51) Int. Cl.
*G02F 1/1335*   (2006.01)
(52) U.S. Cl.
CPC .. *G02F 1/133608* (2013.01); *G02F 1/133603* (2013.01); *G02F 2001/133614* (2013.01)
(58) Field of Classification Search
CPC ......... G02F 1/133608; G02F 1/133603; G02F 2001/133614
See application file for complete search history.

(56) References Cited

U.S. PATENT DOCUMENTS

| 9,541,783 | B2* | 1/2017 | Baek ................ G02F 1/133308 |
| 2006/0050195 | A1* | 3/2006 | Choi ................ G02F 1/133308 349/58 |
| 2006/0098153 | A1* | 5/2006 | Slikkerveer ....... G02F 1/133305 349/187 |
| 2008/0111946 | A1* | 5/2008 | Lee ................... G02F 1/133604 349/62 |
| 2008/0266483 | A1* | 10/2008 | Kim .................... G02B 6/0088 349/58 |
| 2011/0292302 | A1* | 12/2011 | Park .................. G02B 19/0071 348/739 |

(Continued)

FOREIGN PATENT DOCUMENTS

| CN | 204086759 U | * | 1/2015 |
| CN | 105372878 A | * | 3/2016 |

(Continued)

*Primary Examiner* — Mary Ellen Bowman
(74) *Attorney, Agent, or Firm* — Sughrue Mion, PLLC

(57) ABSTRACT

Disclosed herein is an image forming apparatus which includes a display panel, a backlight disposed at a rear side of the display panel, optical sheets disposed at a rear surface of the display panel, a quantum dot sheet disposed at a front side of the backlight, a bottom chassis configured to accommodate the backlight, and a middle holder configured to support outer sides of the quantum dot sheet while installed in the bottom chassis, and thus the quantum dot sheet is installable in conjunction with the middle holder in a state of being spaced apart from the optical sheets.

19 Claims, 24 Drawing Sheets

(56) References Cited

U.S. PATENT DOCUMENTS

| | | | | |
|---|---|---|---|---|
| 2013/0107168 A1* | 5/2013 | Tang | ............... | G02B 6/0088 |
| | | | | 349/62 |
| 2013/0294107 A1* | 11/2013 | Ohkawa | ............ | G02F 1/133615 |
| | | | | 362/606 |
| 2015/0009453 A1* | 1/2015 | Cha | ................. | G02B 6/0001 |
| | | | | 349/65 |
| 2015/0168634 A1* | 6/2015 | Lu | ................... | G02B 6/0031 |
| | | | | 362/606 |
| 2015/0185410 A1* | 7/2015 | Song | ............... | G02B 6/0091 |
| | | | | 349/65 |
| 2015/0219821 A1* | 8/2015 | Seo | ................. | G02B 6/0088 |
| | | | | 362/608 |
| 2015/0219822 A1* | 8/2015 | Lee | ................. | G02B 6/0023 |
| | | | | 362/608 |
| 2015/0286096 A1* | 10/2015 | Kim | ................ | G02B 5/22 |
| | | | | 349/65 |
| 2016/0195673 A1* | 7/2016 | Yoon | .............. | G02B 6/0088 |
| | | | | 362/606 |
| 2016/0223739 A1* | 8/2016 | Yoon | .............. | G02B 6/0088 |
| 2016/0291231 A1* | 10/2016 | Jang | ............... | G02B 6/005 |

FOREIGN PATENT DOCUMENTS

| | | | |
|---|---|---|---|
| KR | 1020070121994 A | 12/2007 | |
| KR | 1020080053699 A | 6/2008 | |
| KR | 1020120066322 A | 6/2012 | |
| KR | 1020140000735 A | 1/2014 | |
| KR | 1020140035113 A | 3/2014 | |

\* cited by examiner

DISPLAY APPARATUS

CROSS-REFERENCE TO RELATED APPLICATION

This application claims the benefit of U.S. Provisional Patent Application No. 62/111,259, filed on Feb. 3, 2015 in the United States Patent and Trademark Office, and priority from Korean Patent Application No. 10-2015-0177106, filed on Dec. 11, 2015 in the Korean Intellectual Property Office, the disclosures of which are incorporated herein by reference in their respective entireties.

BACKGROUND

1. Field

Exemplary embodiments relate to a display apparatus, and more particularly, to a display apparatus having a quantum dot sheet configured to enhance reproducibility of color.

2. Description of the Related Art

In general, a display apparatus is a device configured to display a screen, and includes a monitor or a television.

The display apparatus is provided with a self-emitting display panel, such as a panel that includes an organic light emitting diode, or a light-receiving display panel, such as a liquid crystal display panel, for use thereof.

The display apparatus which has the light-receiving display panel as a display panel includes a backlight configured to supply light to the display panel. In addition, the display apparatus includes optical sheets disposed in between the display panel and the backlight and configured to change characteristics of the light being supplied from the backlight.

The optical sheets include a diffusion sheet configured to diffuse light, and a prism sheet and a polarizing sheet configured to cause the light to be delivered to the display panel at a certain angle.

In addition, there is a display apparatus configured to cause the light that is generated at the backlight to be delivered to the display panel after passing through a quantum dot sheet while the quantum dot sheet is disposed at a front of the backlight.

SUMMARY

Therefore, it is an aspect of one or more exemplary embodiments to provide a display apparatus that has a structure in which a quantum dot sheet and optical sheets are installed while being spaced apart with respect to each other.

It is another aspect of one or more exemplary embodiments to provide a display apparatus configured to further increase an effective area of a display panel at which a screen is displayed.

Additional aspects of the exemplary embodiments will be set forth in part in the description which follows and, in part, will be apparent from the description, or may be learned by practice of the exemplary embodiments.

In accordance with one aspect of one or more exemplary embodiments, a display apparatus includes a display panel, a backlight, a quantum dot sheet, a bottom chassis and a middle holder. The backlight may be disposed at a rear side of the display panel. The quantum dot sheet may be disposed at a front side of the backlight. The bottom chassis may be configured to accommodate the backlight. The middle holder may be configured to support outer sides of the backlight and the quantum dot sheet while being installed in the bottom chassis.

The middle holder may include a holder frame portion, and quantum dot sheet supporting protrusions which protrude forward from the holder frame portion and at which the quantum dot sheet is hooked and supported, and the quantum dot sheet may include quantum dot sheet supporting holes at which corresponding ones from among the quantum dot sheet supporting protrusions are inserted and hooked.

The quantum dot sheet may include quantum dot sheet supporting portions which extend from respective outer side end portions thereof and which are each provided with corresponding ones from among the quantum dot sheet supporting holes.

The display apparatus may further include: a diffusion member disposed at a front side of the backlight, such that a rear surface of the quantum dot sheet is supported at a front surface of the diffusion member.

The backlight may include a light source board disposed at a front surface of the bottom chassis, and a plurality of light-emitting diodes disposed on the light source board and configured to radiate light toward a rear surface of the display panel, and the middle holder may include a board supporting portion configured to support outer sides of the light source board.

The light-emitting diodes may be formed by using blue light-emitting diodes configured to generate blue light, and the quantum dot sheet may be formed by using a yellow color.

The display apparatus may further include: a middle mold configured to support an outer side of the display panel; and at least one optical sheet disposed at a front side of the quantum dot sheet while being spaced apart from the quantum dot sheet.

The middle mold may include a mold frame portion to which the bottom chassis is coupled, a panel supporting portion which extends inward from the mold frame portion and which is configured to support the display panel, and an optical sheet accommodating portion which extends inward from the panel supporting portion while forming a step and which is configured to accommodate the at least one optical sheet.

The at least one optical sheet may include a diffusion sheet configured to diffuse light received from a rear side of the at least one optical sheet.

Each of the display panel, the diffusion member, and the quantum dot sheet may be curvedly bent such that respective side portions thereof are protruded forward with respect to a center portion of the display apparatus.

The middle holder may further include a reflective portion which is inclined with respect to the holder frame portion and extends from the holder frame portion in a rearward direction and is configured to reflect light received from the backlight in a forward direction, and a board supporting portion which extends from a rear end portion of the reflective portion and is configured to support an outer side of the light source board included in the backlight.

In accordance with another aspect of one or more exemplary embodiments, a display apparatus includes a display panel, a backlight, a middle mole and a diffusion sheet. The backlight may be disposed at a rear side of the display panel. The middle mold is configured to support the display panel. The diffusion sheet may be disposed at a front side of the backlight. The middle mold may include a panel supporting portion configured to support an outer side of a rear surface of the display panel is supported, and an optical sheet accommodating portion which extends inward from the panel supporting portion while forming a step and is configured to accommodate the diffusion sheet.

The display apparatus may further include a diffusion member which is disposed at a front side of the backlight and is formed in the shape of a panel, and a quantum dot sheet which includes a rear surface thereof that is supported at a front surface of the diffusion member. The diffusion sheet may be disposed at a front side of the quantum dot sheet while being spaced apart from the quantum dot sheet.

The display apparatus may further include a bottom chassis coupled to a rear of the middle mold and configured to accommodate the backlight. The backlight may include a light source board disposed at a front surface of the bottom chassis, and a plurality of light-emitting diodes disposed on the light source board and configured to radiate light toward a rear surface of the display panel.

The display apparatus may further include a middle holder installed in the bottom chassis and configured to support outer sides of the light source board. The middle holder may include a holder frame portion, sheet supporting protrusions which protrude forward from the holder frame portion and are configured to support the quantum dot sheet, and a board supporting portion configured to support outer sides of the light source board. The quantum dot sheet may include a quantum dot sheet supporting portion which extends from a corresponding outer side end portion of the quantum dot sheet, and quantum dot sheet supporting holes provided at the quantum dot sheet supporting portion and at which corresponding ones from among the quantum dot supporting protrusions are installed.

In accordance with another aspect of one or more exemplary embodiments, a display apparatus includes a display panel, at least one optical sheet, a backlight, a quantum dot sheet, a bottom chassis and a middle holder. The at least one optical sheet may be disposed at a rear side of the display panel. The middle mold may be configured to support outer sides of the display panel and the at least one optical sheet. The backlight may be disposed at a rear side of the display panel. The quantum dot sheet may be disposed at a front side of the backlight and disposed at a rear side of the at least one optical sheet while being spaced apart from the at least one optical sheet. The bottom chassis may be configured to accommodate the backlight. The middle holder may be installed in the bottom chassis and configured to support outer sides of the quantum dot sheet.

The middle mold may include a panel supporting portion at which the display panel is supported, and an optical sheet accommodating portion extended inward from the panel supporting portion while forming a step and at which the at least one optical sheet is accommodated.

The middle holder may include a holder frame portion, and quantum dot sheet supporting protrusions which protrude forward from the holder frame portion and at which the quantum dot sheet is hooked and supported. The quantum dot sheet may include quantum dot sheet supporting holes at which corresponding ones from among the quantum dot sheet supporting protrusions are inserted and supported.

The at least one optical sheet may include a diffusion sheet configured to diffuse light received from a rear side of the at least one optical sheet

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
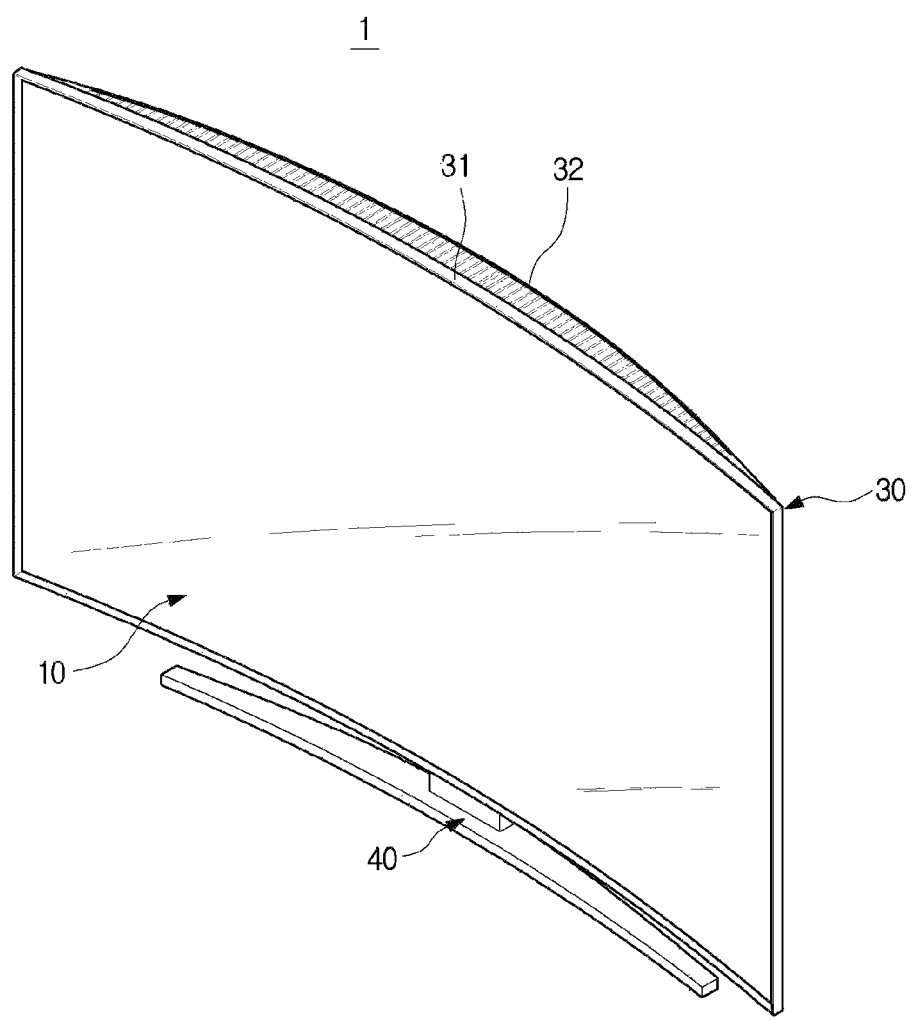
FIG. 1 is a perspective view of a front side of a display apparatus, according to an exemplary embodiment.

Reference will now be made in detail to exemplary embodiments, examples of which are illustrated in the accompanying drawings, wherein like reference numerals refer to like elements throughout.

Figure 2:
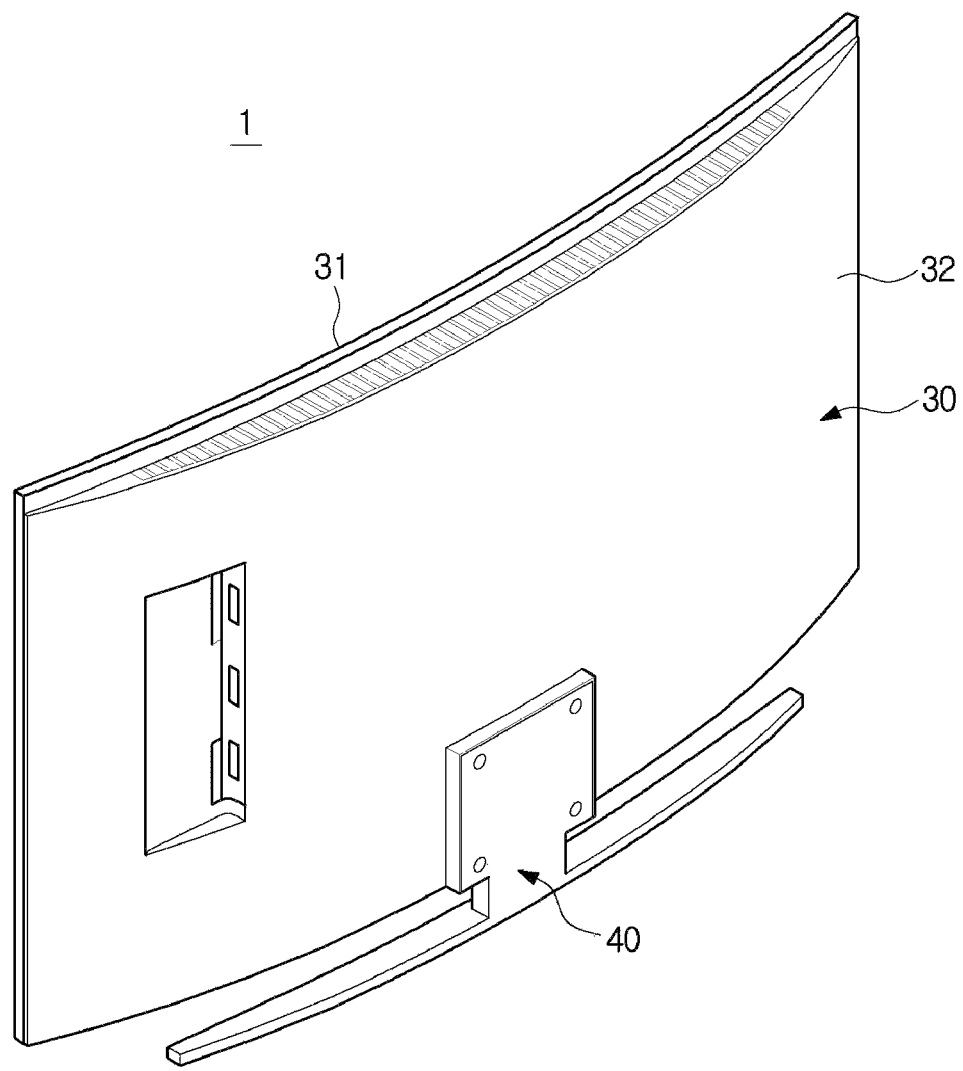
FIG. 2 is a perspective view of a rear side of the display apparatus, according to an exemplary embodiment.
Figure 3:
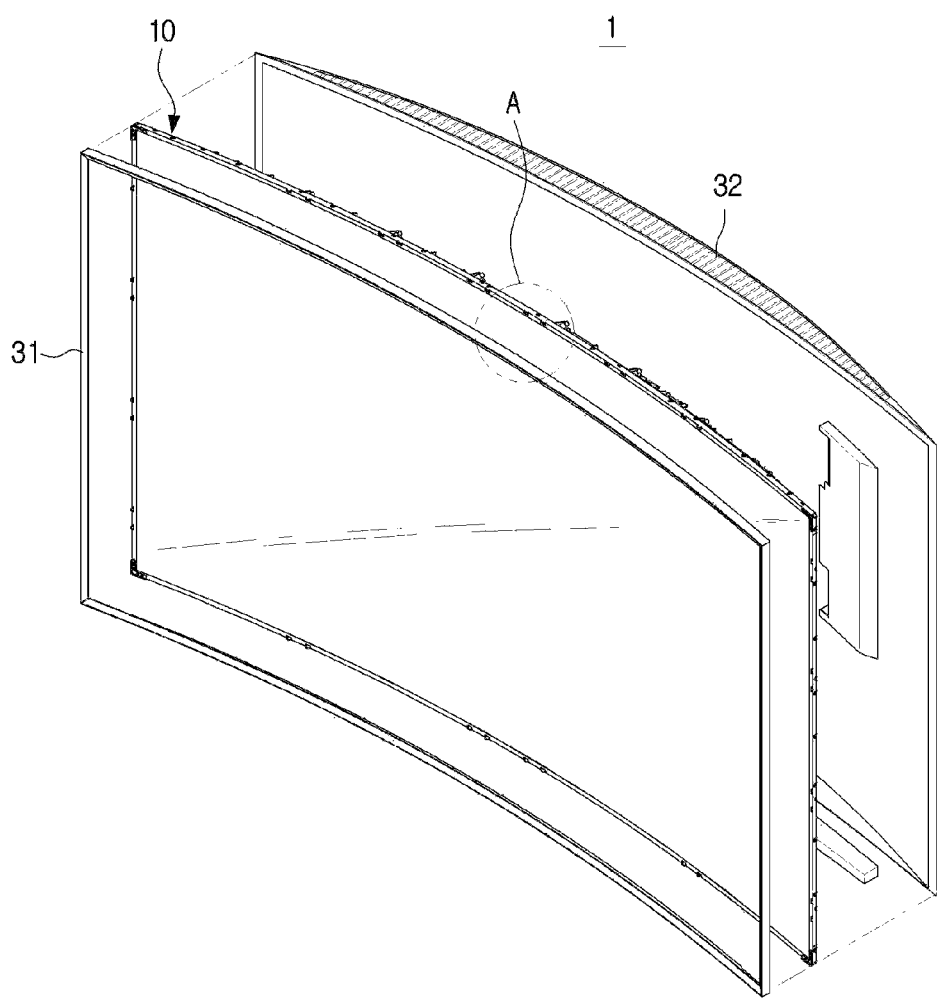
FIG. 3 is an exploded perspective view of a display module and a case with respect to the display apparatus, according to an exemplary embodiment.

As illustrated in FIG. 1, FIG. 2, and FIG. 3, a display apparatus according to an exemplary embodiment is formed to be provided with a screen having a curve. In particular, the display apparatus is formed in the shape of a curve such that both side end portions thereof protrude forwardly with respect to a center portion of the display apparatus, so that a degree of immersion of a viewer when watching the display apparatus 1 may be enhanced.

The display apparatus 1 provided with the screen formed in the shape of a curve is described as an example in the present exemplary embodiment, but is not limited hereto, and a general display apparatus provided with a screen having the shape of a plane or a bendable display apparatus provided with a screen configured to change the shape of a screen into the shape of a plane or a curve may be applicable.

The display apparatus 1 as such includes a display module 10 which is configured to show images, a printed circuit board 20 (see FIG. 4) which is configured to deliver power and an electrical signal to the display module 10, a case 30 which is configured to accommodate the display module 10 and the printed circuit board 20, and a stand 40 which is configured such that the display apparatus 1 may be used while in state of standing on a flat surface.

The case 30 includes a front case portion 31 which forms a bezel portion of the display apparatus 1 while coupled to a front side of the display module 10, and a rear case portion 32 which is configured to accommodate the display module 10 and the above-described printed circuit board 20 while coupled to a rear side of the display module 10.

The display apparatus in the present exemplary embodiment includes the front case portion 31 and a top chassis 15 (see FIG. 4), but is not limited hereto, and the top chassis 15 may be provided to perform a role of the front case portion without a structure that corresponds to the front case.

Figure 4:
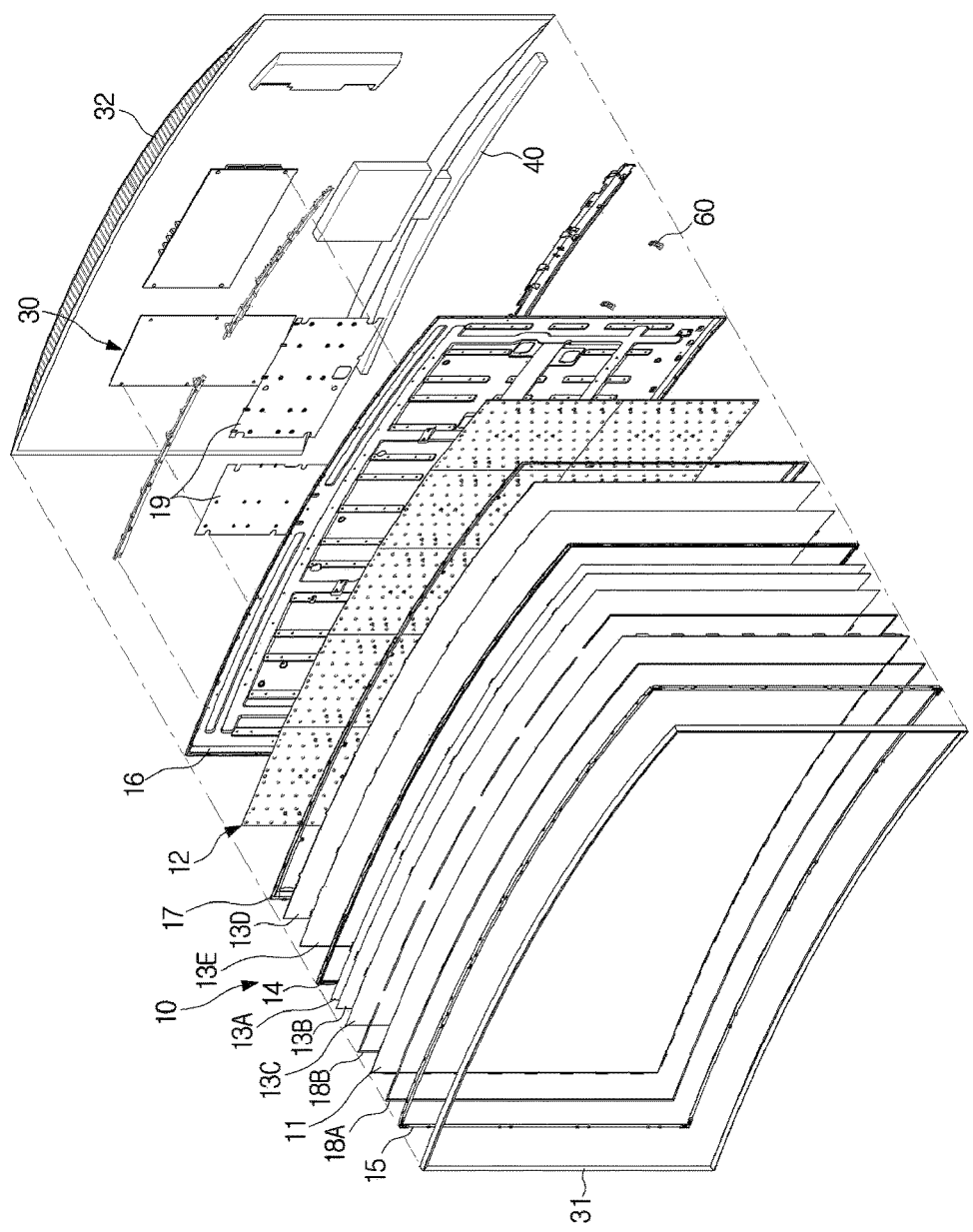
FIG. 4 is an exploded perspective view of the display apparatus, according to an exemplary embodiment.
Figure 5:
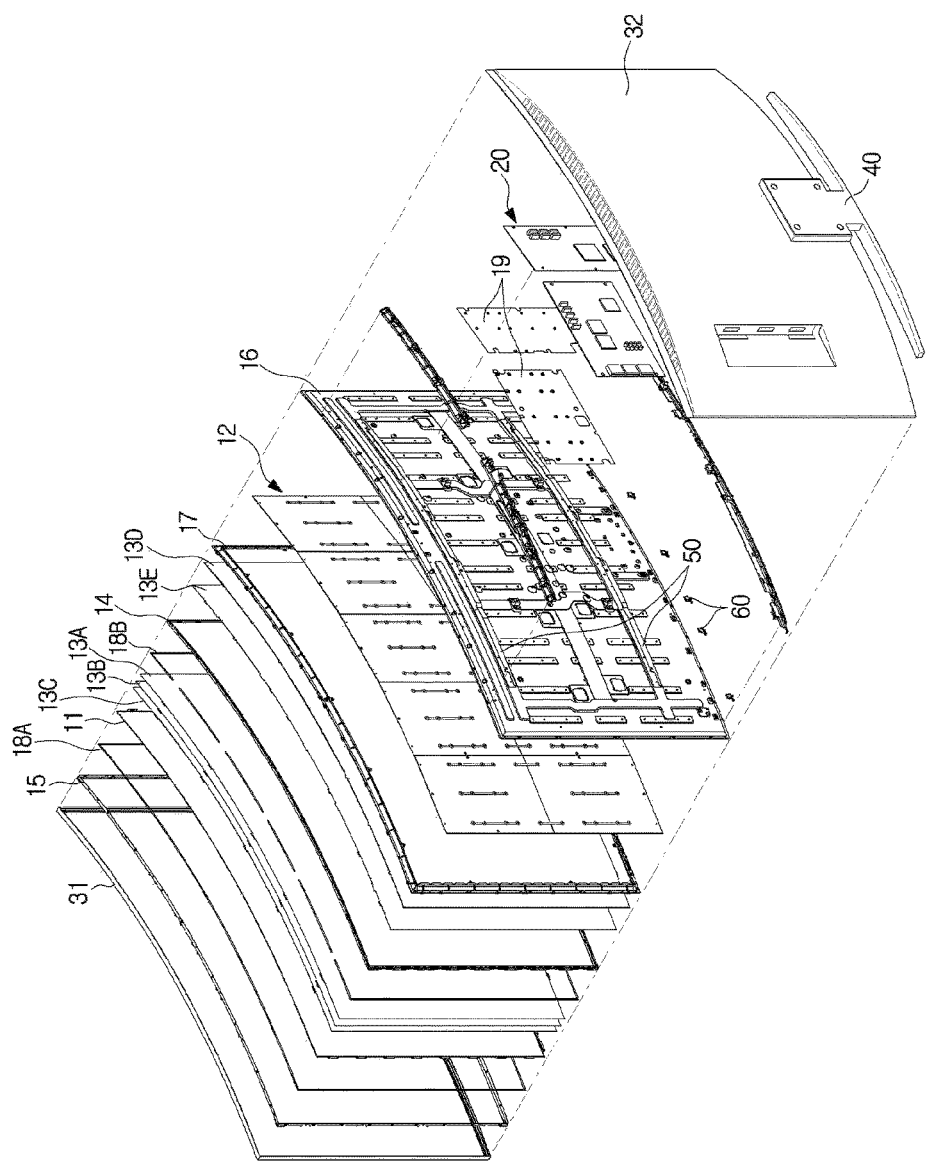
FIG. 5 is an exploded perspective view of a rear side of the display apparatus, according to an exemplary embodiment.

As illustrated in FIG. 4 and FIG. 5, the display module 10 includes a display panel 11 on which images are displayed, a backlight 12 configured to supply light to the display panel 11, optical sheets 13A, 13B, and 13C configured to change the optical characteristics of the light supplied from the backlight 12 while disposed in between the display panel 11 and the backlight 12, a middle mold 14 configured to support one or more outer sides of the display panel 11 and one or more of the optical sheets 13A, 13B, and 13C, the top chassis 15 coupled to a front side of the middle mold 14 and configured to maintain a state of the display panel 11 while installed at the middle mold 14, a bottom chassis 16 configured to accommodate the backlight 12 and coupled to a rear side of the middle mold 14, and a middle holder 17 configured to support an outer side of the backlight 12 while installed at an inside of the bottom chassis 16.

The display panel 11 is structured as a liquid crystal panel which has the shape of a rectangular panel, and an upper end portion and a lower end portion of the display panel 11 are provided with a printed circuit board 20 configured to control the display panel 11 which is connected thereto. The display panel 11 is provided to form a screen of the display apparatus 1, and thus the display panel 11 is disposed in a state such that both side end portions thereof are provided to maintain a state of being curvedly bent so as to be protruding forwardly with respect to a center portion of the display panel 11.

Figure 6:
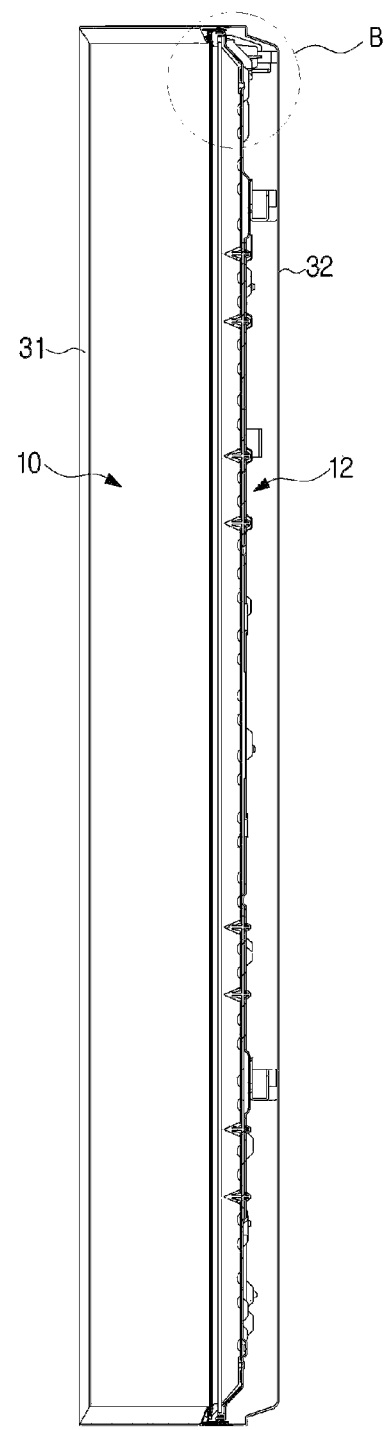
FIG. 6 is a side cross-sectional view of the display apparatus, according to an exemplary embodiment.
Figure 7:
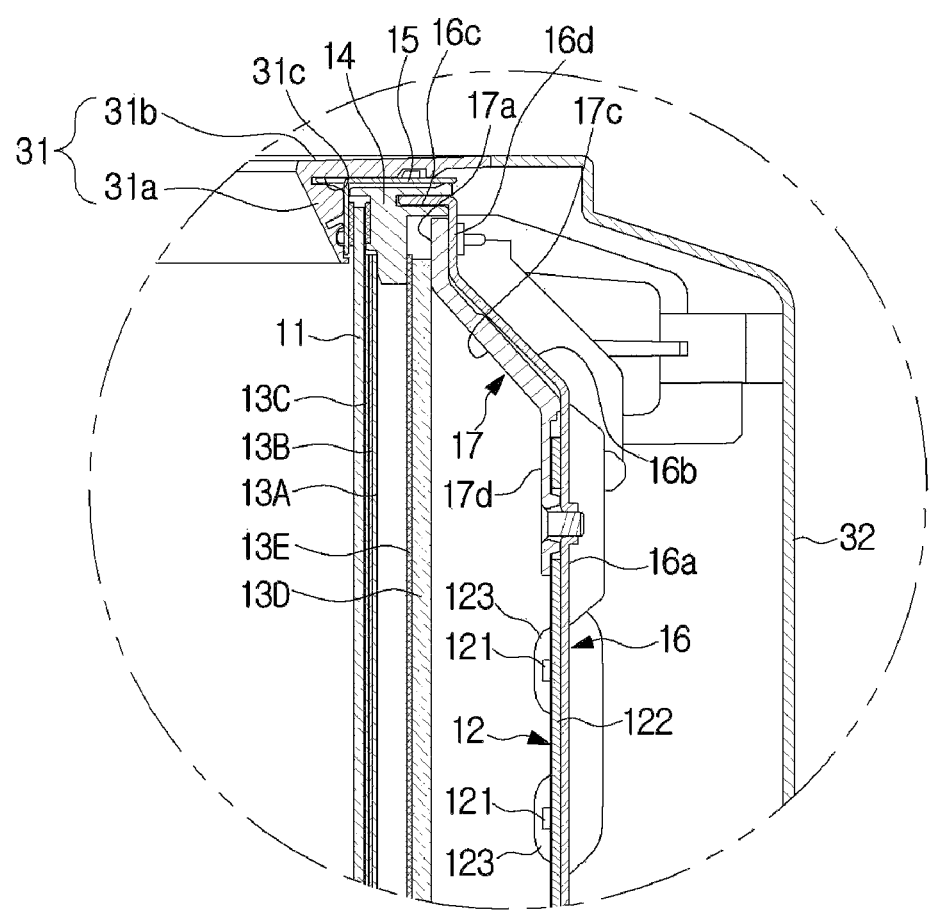
FIG. 7 is an enlarged view of a B portion of FIG. 6.

As illustrated in FIG. 6 and FIG. 7, the backlight 12 is disposed at a rear side of the display panel 11, and includes a plurality of light-emitting diodes 121, a light source board 122 within which the plurality of light-emitting diodes 121 is embedded, and a lens 123 configured to diffuse the light generated at the plurality of light-emitting diodes 121 while disposed at a front side of the light-emitting diodes 121.

The light-emitting diodes 121 in the present exemplary embodiment are provided with blue light-emitting diodes which are configured to generate blue light in order to generate white light in conjunction with a quantum dot sheet 13E, which is to be described below.

Figure 11:
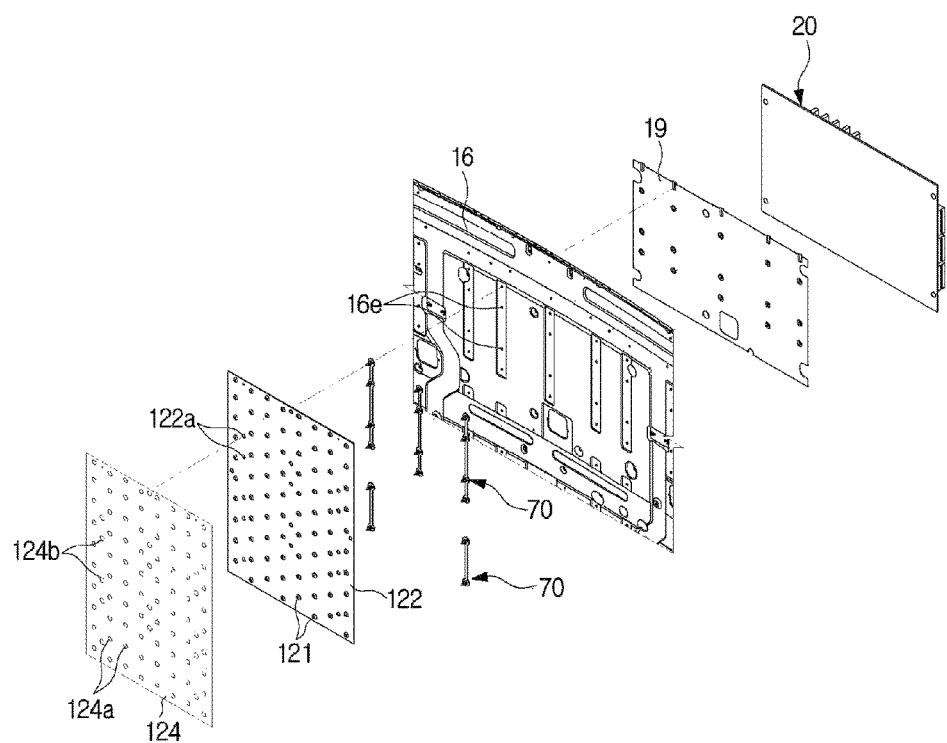
FIG. 11 is an exploded perspective view showing a state of a spacer as installed.

The light source board 122 is formed in the shape of a rectangular panel, and similarly as the display panel 11, the light source panel 122 is provided such that both sides thereof are disposed in a curvedly bent state so as to be protruding forwardly with respect to a center portion of the light source panel 122. In addition, as illustrated in FIG. 11, the light source board 122 is provided with a white reflective sheet 124 which is configured to reflect light and is attached to the light source board 122, and the reflective sheet 124 is provided with holes 124a at positions which correspond to respective positions of the light-emitting diodes 121.

The light source board 122 in the present exemplary embodiment is provided with a plurality of partial boards, each of which is embedded with the light-emitting diode 121 and is disposed in a parallel arrangement so as to form rows and columns in correspondence with the large-size display panel 11.

The backlight 12 in the present exemplary embodiment includes the light source board 122 formed by using the plurality of partial boards, but is not limited hereto, and the backlight 12 may be provided to include the light source board 122 in a configuration such that these components are structured in a single panel.

Figure 16:
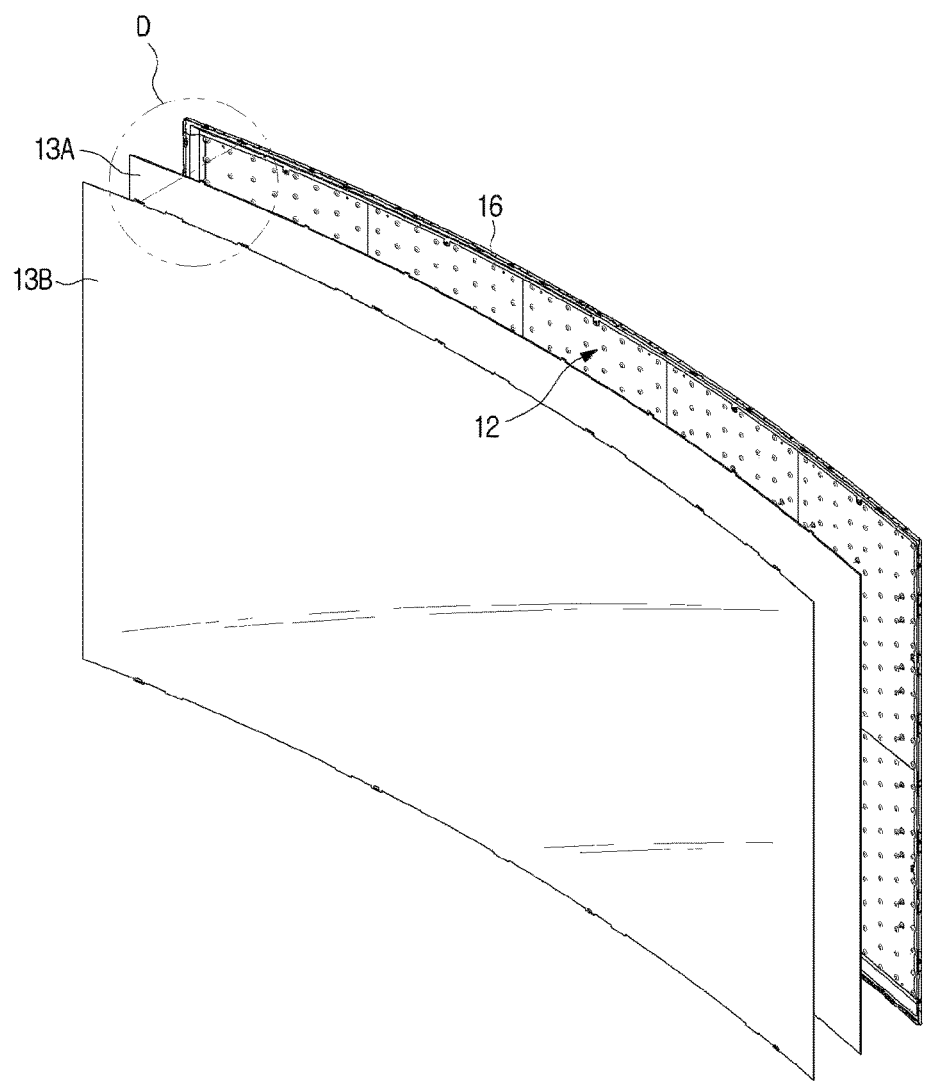
FIG. 16 is an exploded perspective view showing a state of a diffusion member and a quantum dot sheet as installed.

Referring also to FIG. 16, the optical sheets 13A, 13B, and 13C include a diffusion sheet 13A which is configured to diffuse the light received from a rear side, and a prism sheet 13B and a polarizing sheet 13C which are configured to cause the light to be delivered to the display panel 11 at an angle which falls within a predetermined range. In addition, other than the optical sheets mentioned above, various types of optical sheets may be used so as to improve the optical characteristics of the propagating light.

The optical sheets 13A, 13B, and 13C are provided with shapes which correspond to a rear surface of the display panel 11 while being successively disposed at the rear surface of the display panel 11. The display panel 11 in the present exemplary embodiment is provided such that both side end portions thereof are disposed in a curvedly bent state so as to be protruding forwardly with respect to a center portion of the display panel 11, and thus the optical sheets 13A, 13B, and 13C are also provided to maintain a curvedly bent state similarly as the display panel 11.

In addition, the display module 10 includes a diffusion member 13D which is configured to diffuse the light supplied from the backlight 12 while disposed at a front side of the backlight 12, and the quantum dot sheet 13E which is disposed so as to be supported at a front surface of the diffusion member 13D so as to improve the reproducibility of color. The quantum dot sheet 13E in the present exemplary embodiment is disposed at a rear side of the optical sheets 13A, 13B, and 13C while being spaced apart, so as to obtain further even optical diffusion by causing the light which propagates through the quantum dot sheet 13E to be diffused at a space in between the quantum dot sheet 13E and the optical sheets 13A, 13B, and 13C.

The diffusion member 13D is provided to diffuse the light received from a rear side while being formed with white, semi-transparent material. Therefore, the light supplied from the backlight 12 at a rear side is diffused in a process of propagating through the diffusion member 13D, and then is delivered toward the display panel 11.

The diffusion member 13D as such is formed in the shape of a rectangular panel so as to correspond to the display panel 11, and similarly as the display panel, the diffusion member 13D is disposed in a curvedly bent shape such that both sides thereof protrude forwardly with respect to a center portion thereof.

Hereinafter, a description with respect to the quantum dot sheet 13E will be provided.

A quantum dot is a substance which generates strong fluorescence from a relatively narrow wavelength range, and may generate all colors of a visible ray based on the size of the quantum dot. The quantum dot as such is provided to self-generate natural color, and thus, loss of color is reduced and color reproducibility is relatively high. The quantum dot is provided to generate light which has a relatively short wavelength when the particle of the quantum dot is correspondingly small, and to generate light which has a relatively long wavelength when the particle of the quantum dot is correspondingly large. The quantum dot as such may be composed of a chemical compound such as, for example, any of cadmium selenide (CdSe), cadmium sulfide (CdS), cadmium telluride (CdTe), zinc selenide (ZnSe), zinc telluride (ZnTe), and zinc sulfide (ZnS).

The quantum dot sheet 13E is a sheet which includes the above-described quantum dots, and with respect to one or more exemplary embodiments, the quantum dot sheet 13E is provided to generate white color when used in conjunction with the light-emitting diodes 121 which are structured by using the blue light-emitting diodes.

A rear surface of the quantum dot sheet 13E is provided with a shape which corresponds to the diffusion member 13D while being supported at a front surface of the diffusion member 13D. The diffusion member 13D in the present exemplary embodiment is disposed such that both sides thereof are curvedly bent so as to protrude forwardly with respect to a center portion thereof, and thus the quantum dot sheet 13E which includes the rear surface thereof and is supported at the front surface of the diffusion member 13D is similarly disposed such that both sides thereof are curvedly bent so as to protrude forwardly with respect to a center portion thereof.

The diffusion member 13D and the quantum dot sheet 13E in the present exemplary embodiment are provided in a curvedly bent state so as to correspond to the curvedly bent display panel 11, and are not limited hereto, and in a case in which the diffusion member 13D and the quantum dot sheet 13E are applied to a general display apparatus provided with the display panel 11 in a plane state, the diffusion member 13D and the quantum dot sheet 13E are also disposed in a plane state similarly as the display panel 11.

Figure 8:
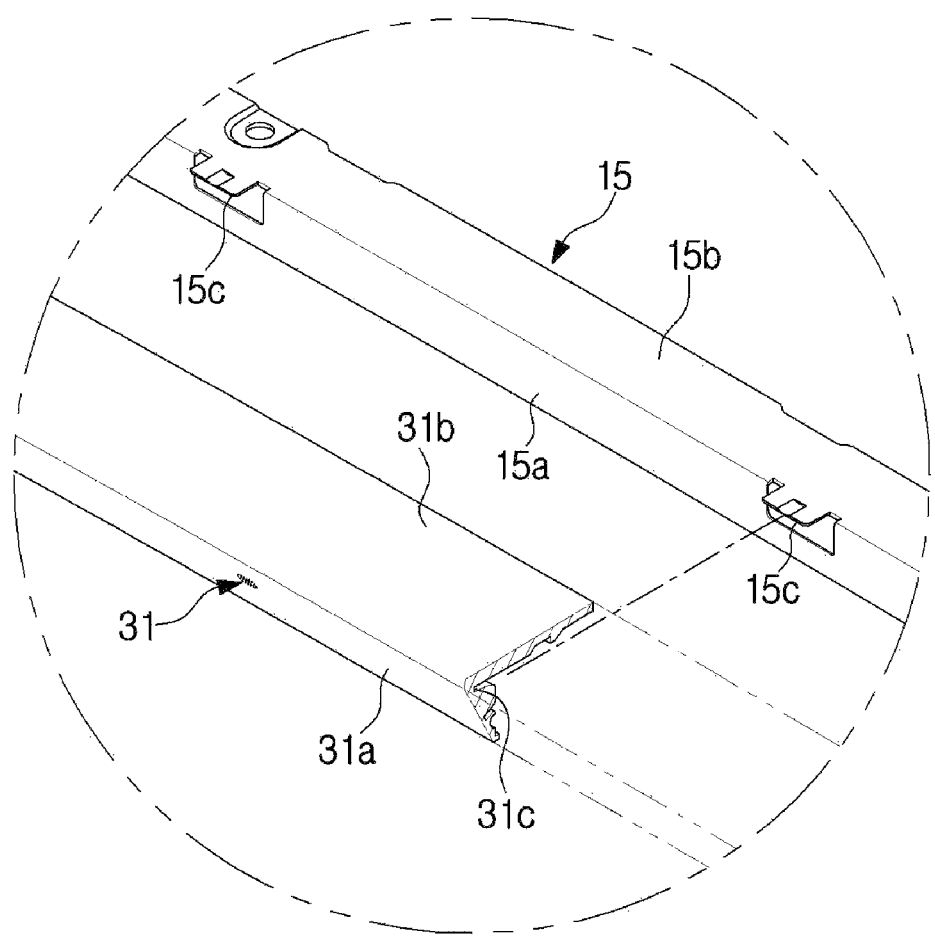
FIG. 8 is an enlarged view of an A portion of FIG. 3, including a partial enlargement perspective view showing a coupling of a front case and a top chassis.

The top chassis 15 is formed in the shape of a rectangular ring, and as illustrated in FIG. 8, includes a top front portion 15a which is configured to support an outer side of a front surface of the display panel 11, and a top side portion 15b which is coupled to the middle mold 14 and which extends from the top front portion 15a in a rearward direction. In addition, the top chassis 15 includes an insertion piece 15c which is inserted into the front case portion 31, which is to be described below, while protruding in a frontward direction from the top front portion 15a.

The front case portion 31 includes a bezel portion 31a which forms a front surface of the front case portion 31, and a top side portion 31b which is coupled to the top chassis 15 and which extends from the bezel portion 31a in a rearward direction. In addition, a rear surface of the front case portion 31 is provided with an insertion slit 31c into which the above-described insertion piece 15c is inserted.

Figure 15:
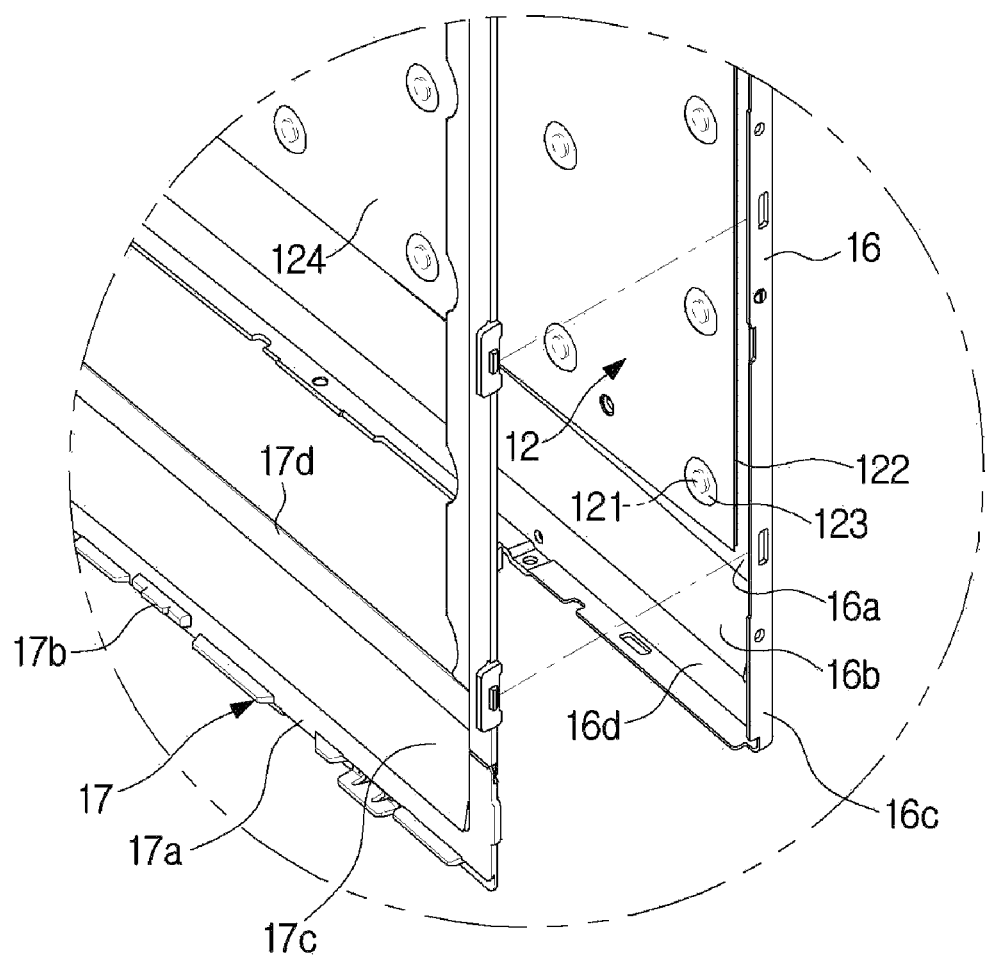
FIG. 15 is an enlarged view of a C portion of FIG. 14.
Figure 18:
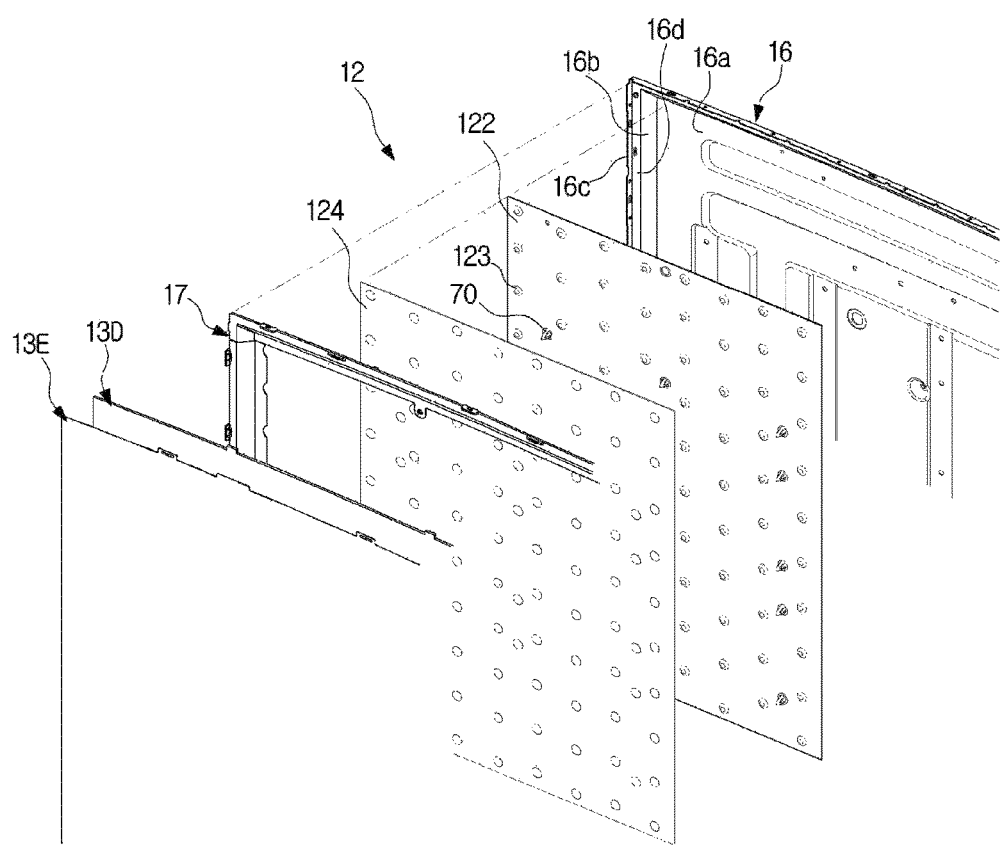
FIG. 18 is an exploded perspective view showing a state of a reflective sheet and a middle holder as installed.
Figure 19:
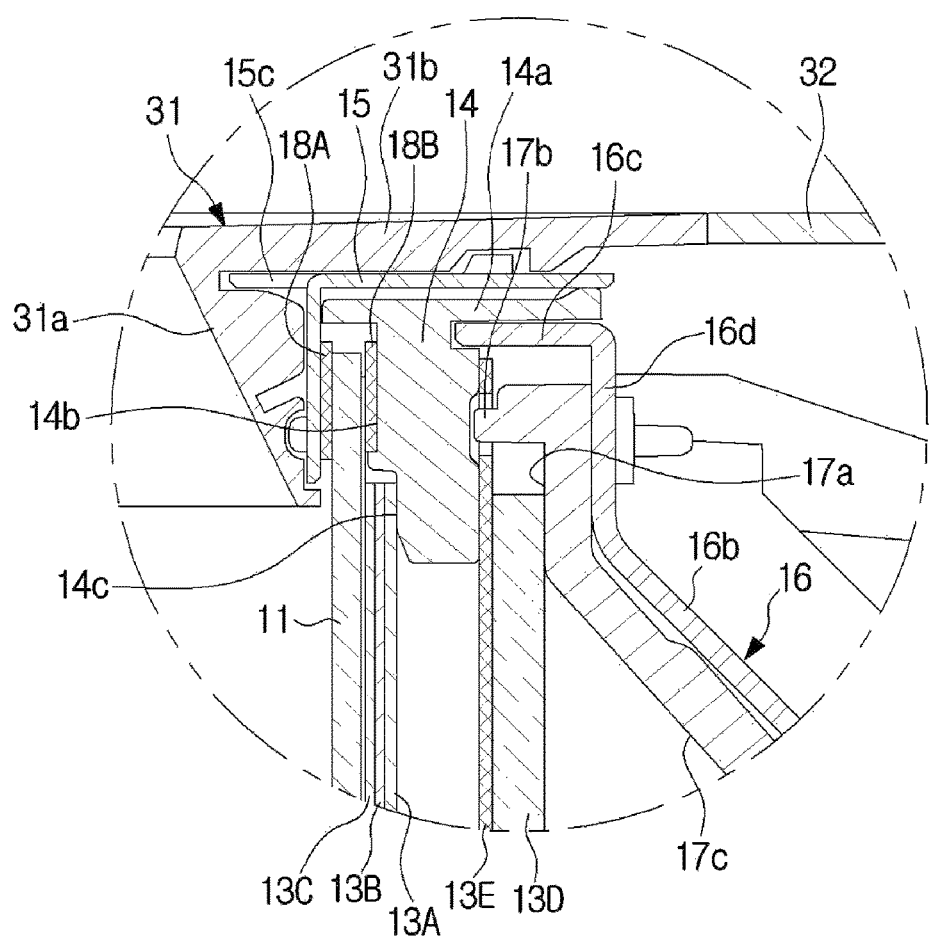
FIG. 19 is a cross-sectional view showing a state of the diffusion sheet and the quantum dot sheet as installed.

The bottom chassis 16 is formed in the shape of a rectangular form of a box for which a front surface thereof is open, and as illustrated in FIG. 15, FIG. 18, and FIG. 19, is configured to accommodate the above-described backlight 12 at an inside thereof. The bottom chassis 16 is formed in the shape of a rectangular panel so as to form a rear surface of the bottom chassis 16, and the front surface thereof includes a bottom rear portion 16a at which a rear surface of the above-described light source board 122 is supported, a bottom inclination portion 16b which is inclinedly extended in a frontward direction from four end portions of the bottom rear portion 16a, a bottom side portion 16c which forms a front end portion of the bottom chassis 16 and which is coupled to the middle mold 14, and a holder mounting portion 16d provided in between the bottom side portion 16c and the bottom side portion 16c in the form of a step and at which the middle holder 17, which is to be described below, is mounted and supported.

Figure 14:
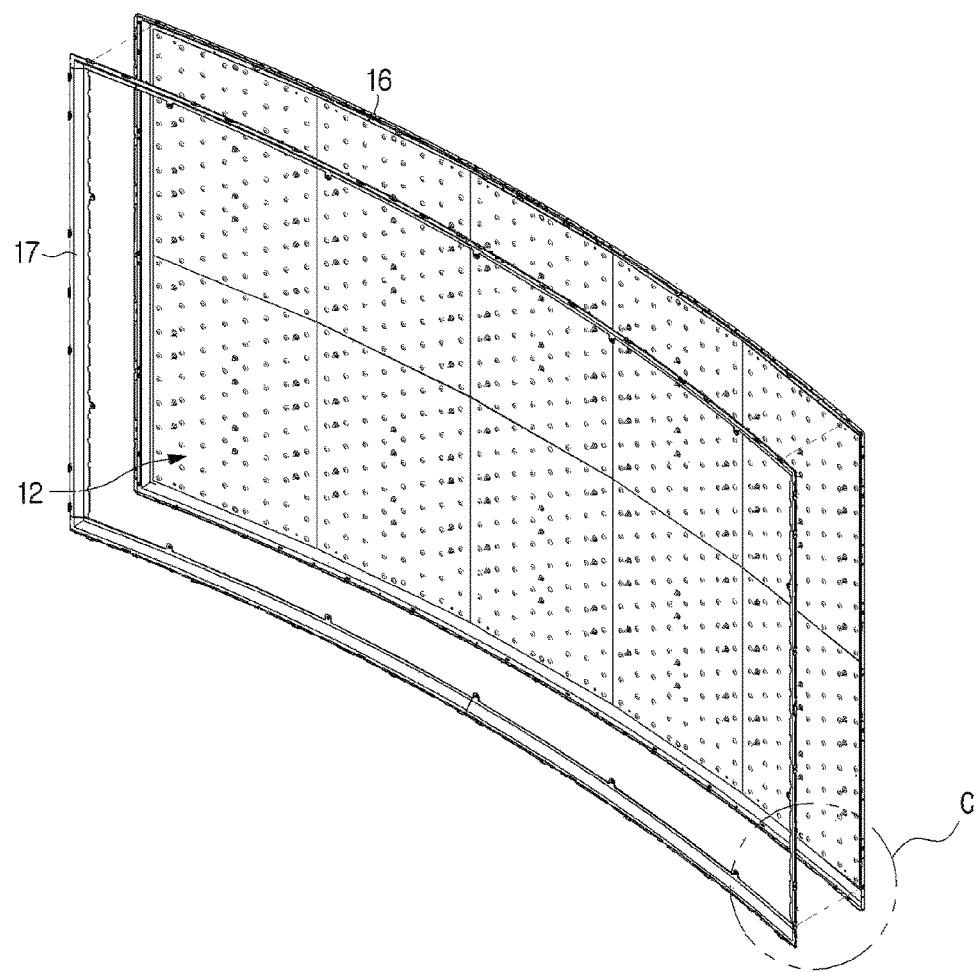
FIG. 14 is an exploded perspective view of a middle mold and the bottom chassis.

An outer side of an inside of the bottom chassis 16 is provided with the above-described middle holder 17, as illustrated in FIG. 14.

Figure 17:
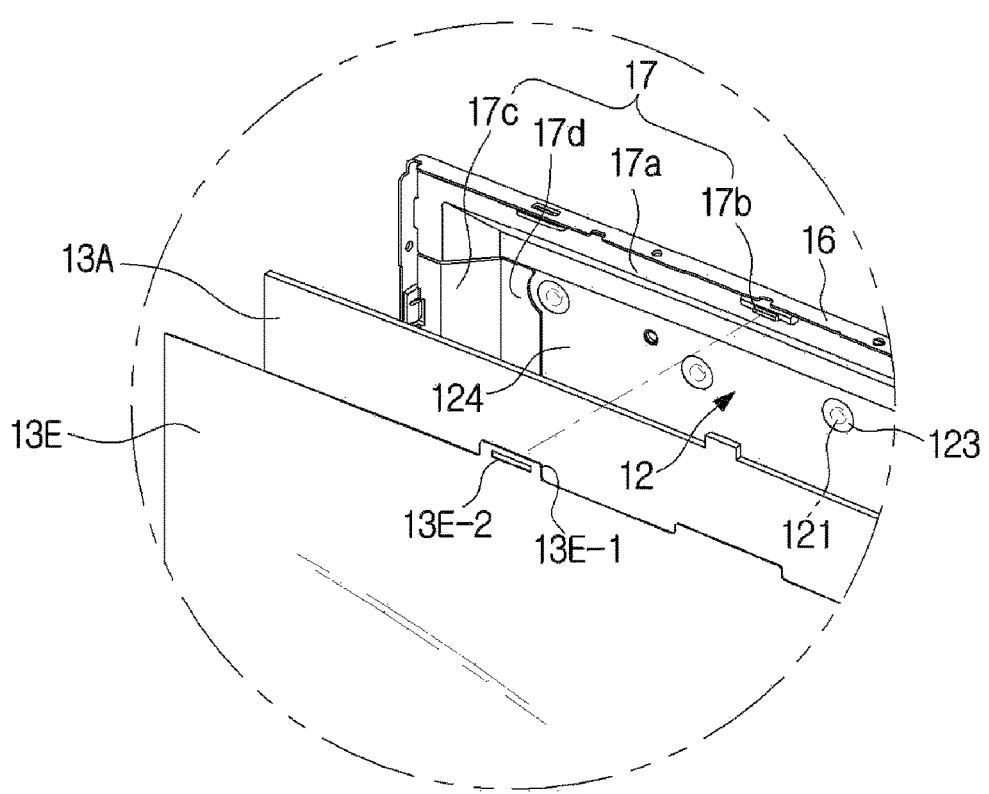
FIG. 17 is an enlarged view of a D portion of FIG. 16.

The middle holder 17 is formed by using white color so as to reflect the light generated by the light-emitting diodes 121. Referring to FIG. 15 and FIG. 17, the middle holder 17 includes a diffusion member mounting portion 17a at which an outer side of a rear surface of the diffusion member 13D is mounted and supported while being formed in the approximate shape of a rectangular ring, quantum dot sheet supporting protrusions 17b which are configured to support the quantum dot sheet 13E while protruding frontwardly from an outer side end of the mounting portion 17a, a reflective portion 17c which is configured to reflect the light received from the backlight 12 toward the diffusion member 13D while being inclinedly extended toward a rear side of the bottom chassis 16 from an inner side end of the diffusion member mounting portion 17a, and a board supporting portion 17d which is extended toward an inner side from a rear end portion of the reflective portion 17c and configured to support an outer side of the light source board 122 while being formed in the shape of a rectangular ring so as to correspond to an outer side of the light source board 122. Therefore, the middle holder 17 is provided to perform several functions, including reflecting the light radiated from the light-emitting diodes 121 toward the display panel 11, supporting an outer side of the light source board 122, and supporting an outer side of the quantum dot sheet 13E.

As illustrated in FIG. 17 and FIG. 19, an outer side of the quantum dot sheet 13E is provided with quantum dot sheet supporting portions 13E-1 which extend toward a position that corresponds to the quantum dot sheet supporting protrusions 17b provided at the middle holder 17, and the quantum dot sheet supporting portions 13E-1 are provided with quantum dot sheet supporting holes 13E-2 at which the quantum dot supporting protrusions 17b are inserted and hooked, respectively.

The reflective sheet 124 and the middle holder 17 in the present exemplary embodiment are formed by using white color so as to reflect the light generated by the backlight 12, but are not limited hereto, and as described above, the light-emitting diodes 121 are formed by using the blue light-emitting diodes which generate blue light in the present exemplary embodiment, and thus the reflective sheet 124 and the middle holder 17 may be formed by using blue color so as to reflect blue light.

Figure 9:
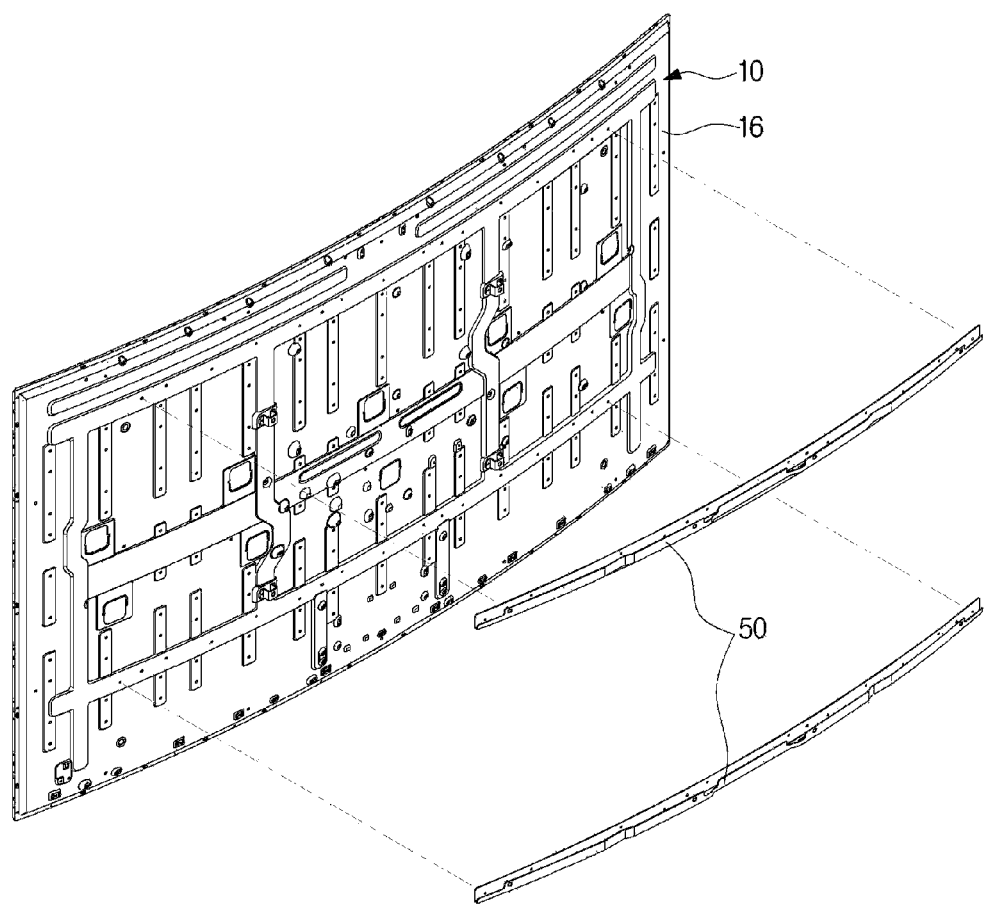
FIG. 9 is an exploded perspective view showing a coupling of a bottom chassis and a reinforcing member.
Figure 10:
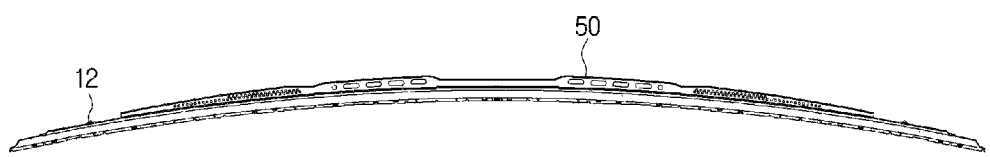
FIG. 10 is a plane view showing a state of the reinforcing member as installed.
Figure 23:
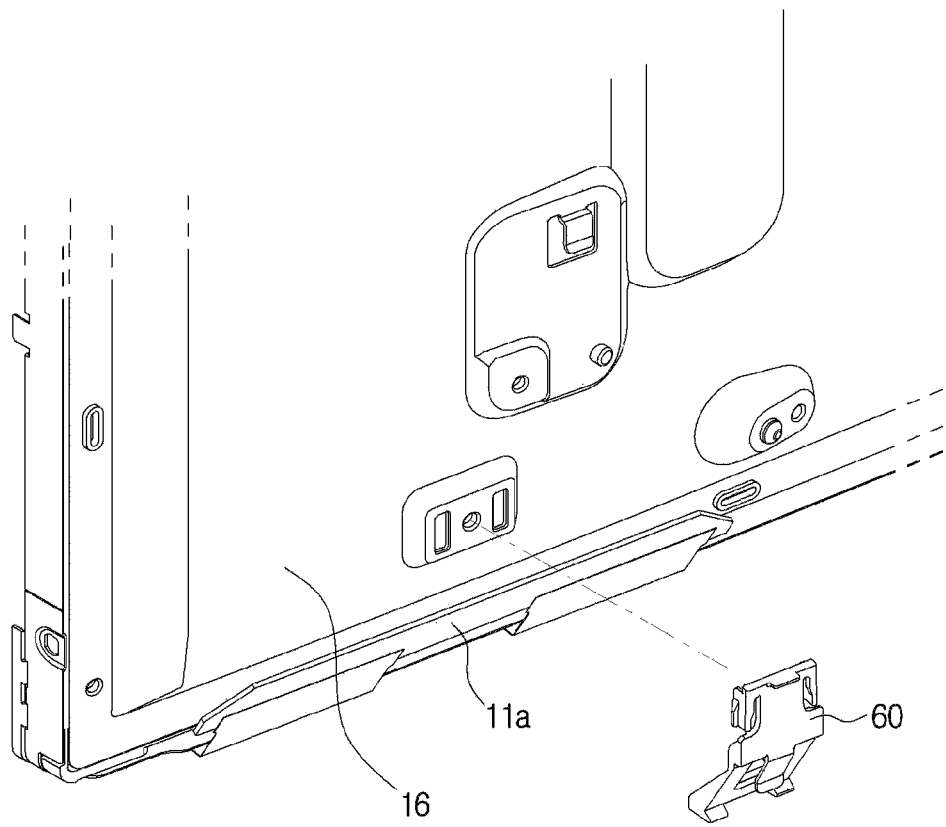
FIG. 23 is an exploded perspective view showing a state of a board supporting member supporting a source printed circuit board as installed.
Figure 24:
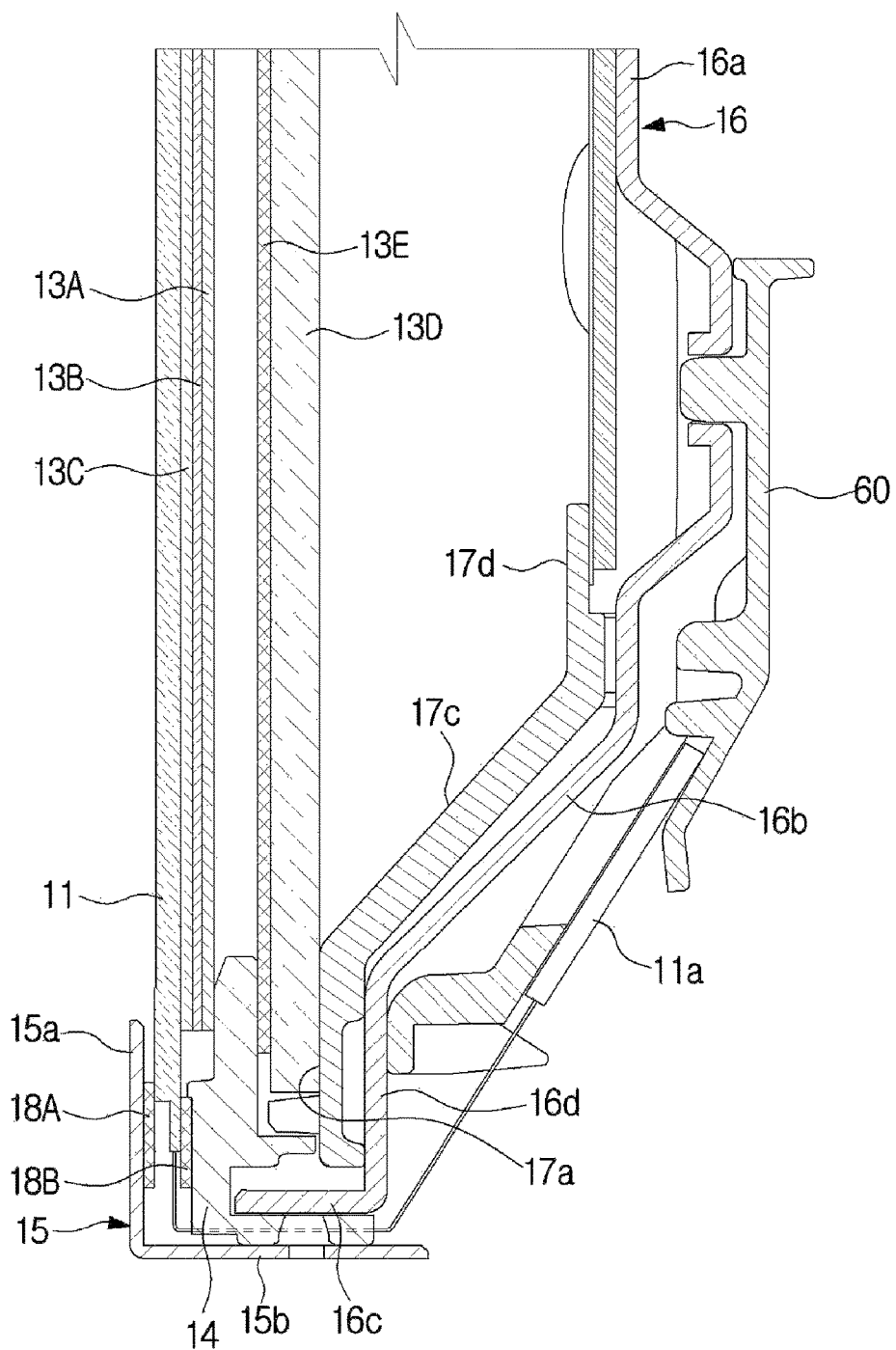
FIG. 24 is a cross-sectional view of the source printed circuit board and the board supporting member.

As illustrated in FIG. 23 and FIG. 24, an upper portion and a lower portion of a rear side of the bottom chassis 16 are provided with board supporting members 60 installed thereon, respectively, so as to support the above-described source printed circuit board 11a, and as illustrated in FIG. 9 and FIG. 10, a rear surface of the bottom chassis 16 is provided with an reinforcing frame 50 installed thereon such that the bottom chassis 16 may maintain a curvedly bent state.

Figure 13:
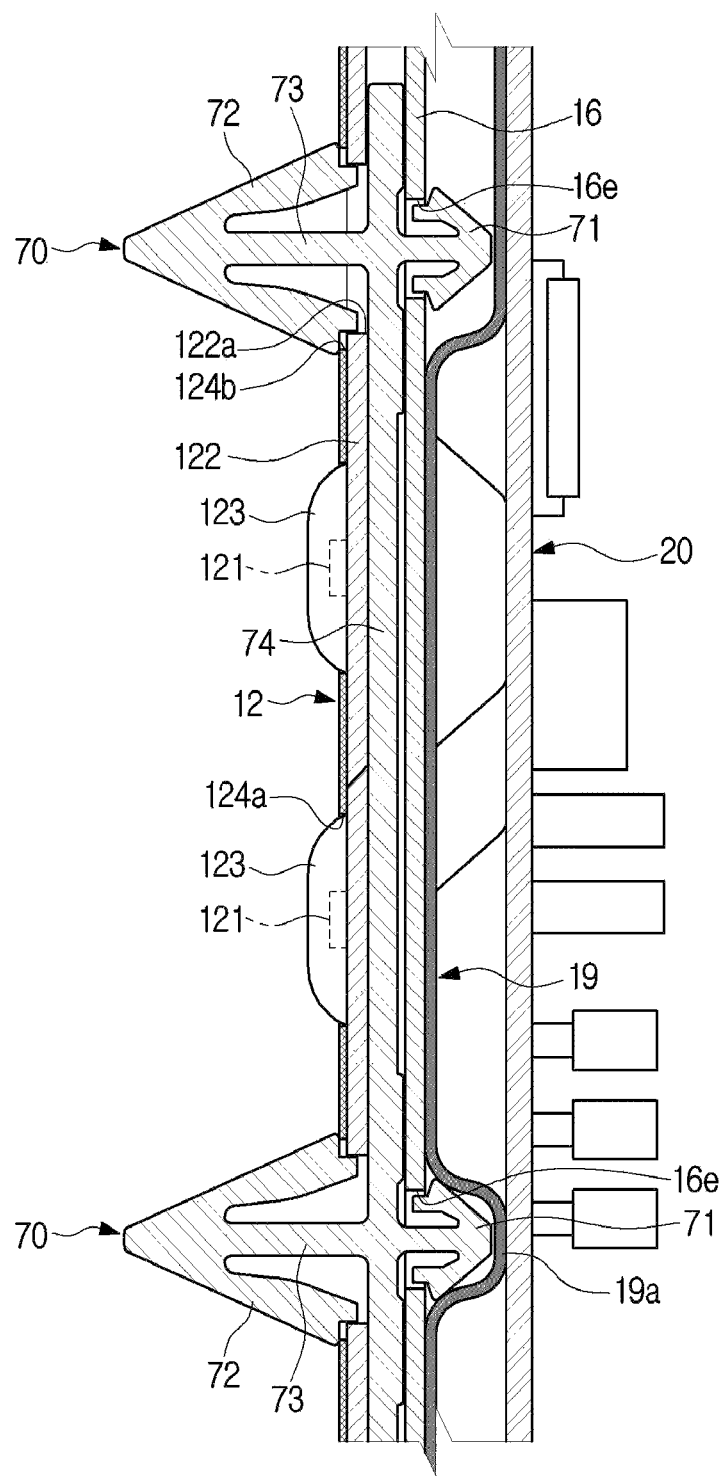
FIG. 13 is a cross-sectional view showing a state of the spacer as installed.

In addition, as illustrated in FIG. 11 and FIG. 13, the bottom chassis 16 is provided with spacers 70 installed thereon such that the diffusion member 13D may maintain a state of being spaced apart by a predetermined distance with respect to the bottom chassis 16.

The spacer 70 includes a hook portion 71 configured such that the spacer 70 is hooked and installed at the bottom chassis 16, and a diffusion member supporting portion 72 disposed in between the bottom chassis 16 and the diffusion member 13D and provided such that the diffusion member 13D may be supported at the bottom chassis 16 through the spacer 70 while a front end portion of the diffusion member supporting portion 72 is supported at a rear surface of the diffusion member 13D.

Regarding the installation of the space 70, the light source board 122 and the reflective sheet 124 are provided with penetration holes 122a and 124b through which the hook portion 71 penetrates, and the bottom chassis 16 is provided with coupling holes 16e such that for each respective coupling hole 163, the hook portion 71 is hooked and coupled at an adjacent portion of the coupling hole 16e after the hook portion 71 is passed therethrough. Therefore, the spacer 70, together with being configured to maintain a state of the diffusion member 13D to be spaced apart by a predetermined distance with respect to the bottom chassis 16, is provided to perform a function of maintaining a state of the light source board 124 to be installed at the bottom chassis 16.

In addition, the spacer 70 in the present exemplary embodiment is provided such that the plurality of spacers 70 is integrally connected to one another through a connection portion 74 so that an installation and storage may be easily performed.

In addition, a rear surface of the bottom chassis 16 is provided with the printed circuit board 20 disposed thereto so as to enable control of the display apparatus 1. The printed circuit board 20 may include a power board configured to supply power, a panel driving board configured to deliver power to the display panel 11, a timing control board configured to deliver image signals to the display panel 11, and a signal processing board configured to process image and sound signals.

Figure 12:
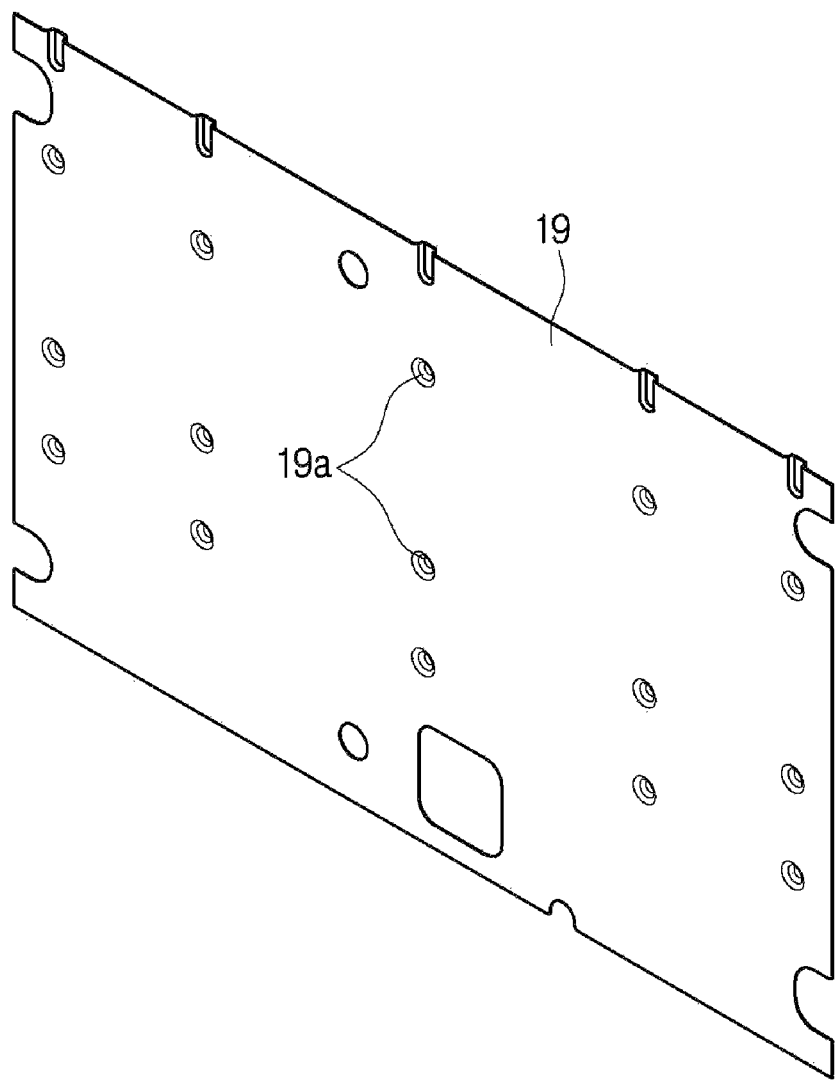
FIG. 12 is a perspective view of a heat-radiating sheet.

At this time, as illustrated in FIG. 11 and FIG. 12, a rear surface of the bottom chassis 16 may be provided with a heat-radiating sheet 19 and arranged at a position that corresponds to the printed circuit boards 20 so as to prevent the heat generated by the printed circuit boards 20 from being delivered toward a front portion of the apparatus. The heat-radiating sheet 19 is provided with concave portions 19a configured such that the above-described hook portion 71 of the spacer 70 may be accommodated at an inner side.

Referring to FIG. 19, the middle mold 14 includes a mold frame portion 14a which is coupled to the above-described top chassis 15 and the bottom chassis 16 while being formed in the shape of a rectangular ring, a panel supporting portion 14b which protrudes from an inner surface of the mold frame portion 14a and at which an outer side of a rear surface of the above-described display panel 11 is supported, and an optical sheet accommodation portion 14c which extends toward an inner side from the panel supporting portion 14b while being formed in the shape of a step with respect to the panel supporting portion 14b such that the above-described optical sheets 13A, 13B, and 13C are accommodated, and such that the light supplied from the backlight 12 is delivered toward the display panel 11 through an inner space of the optical sheet accommodation portion 14c. The optical sheet accommodation portion 14c is provided with optical sheet supporting protrusions (not shown) so as to support the optical sheets 13A, 13B, and 13C while being protruded toward a front portion of the display panel, and outer sides of the optical sheets 13A, 13B, and 13C are provided with optical sheet supporting holes (not shown) at which optical sheet supporting portions 14d are inserted and hooked.

In one or more exemplary embodiments, an end portion of the display panel 11 is spaced apart from the mold frame portion 14a, and a step portion in between the optical sheet accommodation portion 14c and the panel supporting portion 14b is spaced apart from end portions of the optical sheets 13A, 13B, and 13C, so as to correspond to the heat expansion of the display panel 11 and the optical sheets 13A, 13B, and 13C.

In particular, among the optical sheets 13A, 13B, and 13C, the optical sheet accommodation portion 14c is provided with the diffusion sheet 13A as described above. Therefore, the light supplied from the backlight 12 propagates through an inner side of the optical sheet accommodation portion 14c of the middle mold 14, and then is diffused again by use of the diffusion sheet 13A. Therefore, a screen may be displayed at an area of the display panel 11 which corresponds to the area of the diffusion sheet 13A, and thereby the effective display area of the display apparatus 1 may be further increased.

In addition, as described above, the quantum dot sheet 13E is supported by using the middle holder 17, and the optical sheets 13A, 13B, and 13C are mounted at the optical sheet accommodation portion 14c, and thus the quantum dot sheet 13E and the optical sheets 13A, 13B, and 13C are disposed in a state of being spaced apart with respect to each other by about the thickness of the optical sheet accommodation portion 14c. Therefore, the light that propagates through the quantum dot sheet 13E is diffused in a space in between the quantum dot sheet 13E and the optical sheets 13A, 13B, and 13C, and then may be incident at the optical sheets 13A, 13B, and 13C.

A rear surface of the top front portion 15a, as well as the panel supporting portion 14b of the middle mold 14, may be provided with a mounting sheet 18 so as to support an outer side of the display panel 11. Mounting sheets 18A and 18B are formed by using a material which is provided to be elastically deformed, and is configured to absorb light while being formed by using a black color so that a light leaking phenomenon may be prevented.

Figure 20:
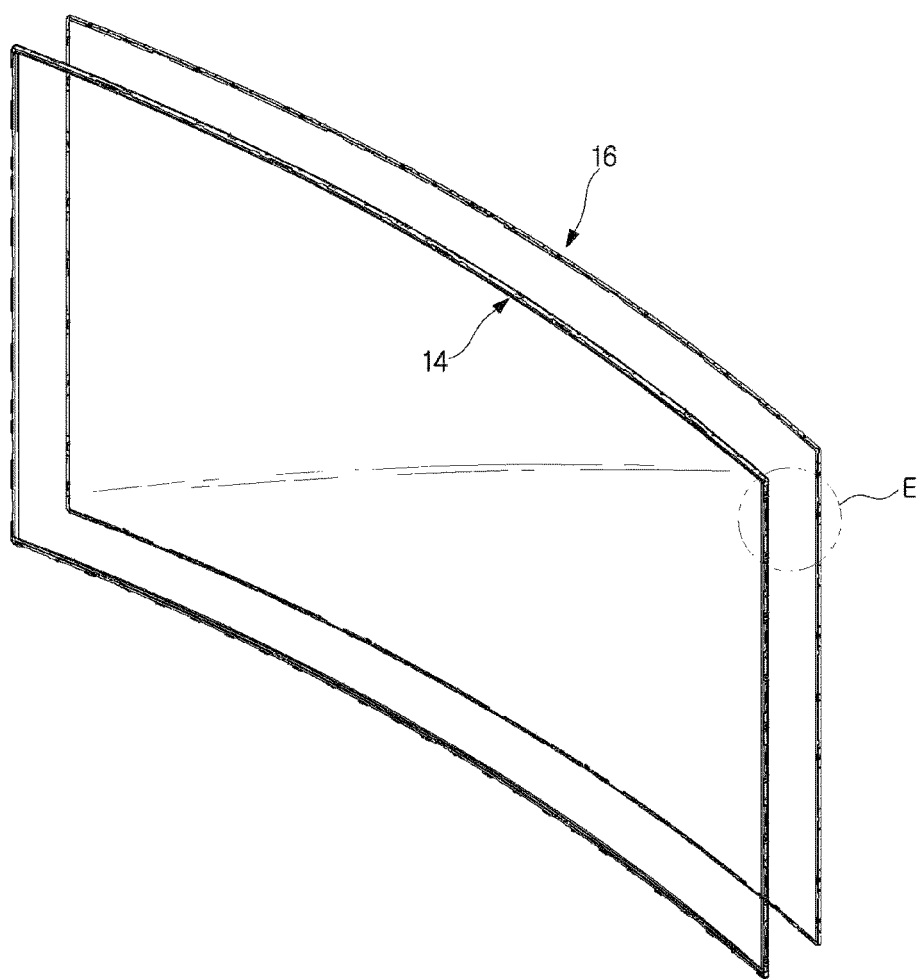
FIG. 20 is an exploded perspective view showing a coupling of the middle mold and the bottom chassis.
Figure 21:
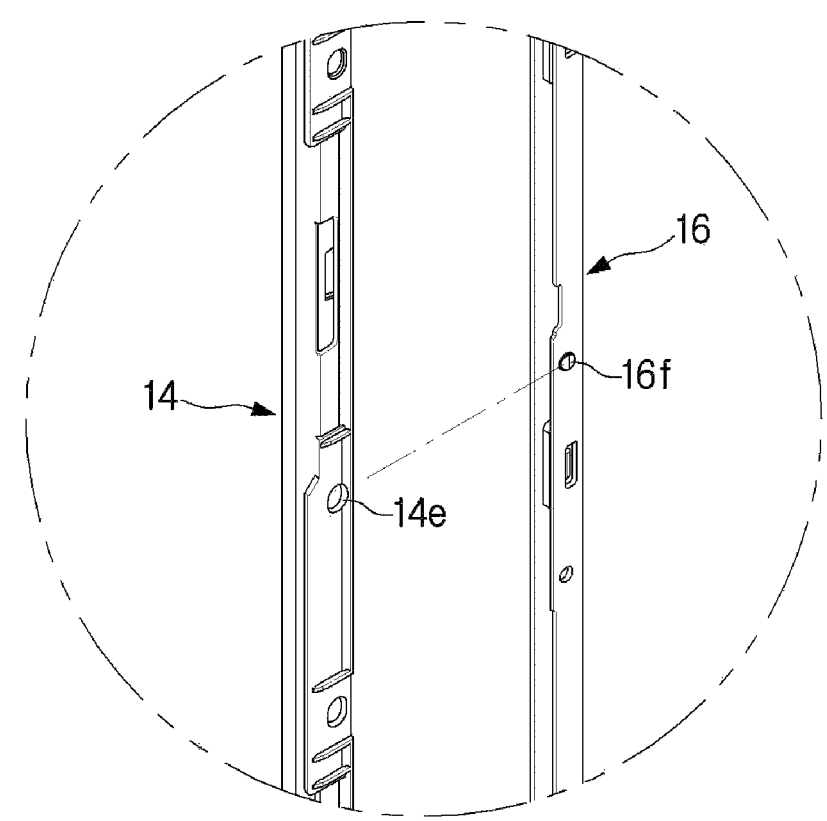
FIG. 21 is an enlarged view of an E portion of FIG. 19.
Figure 22:
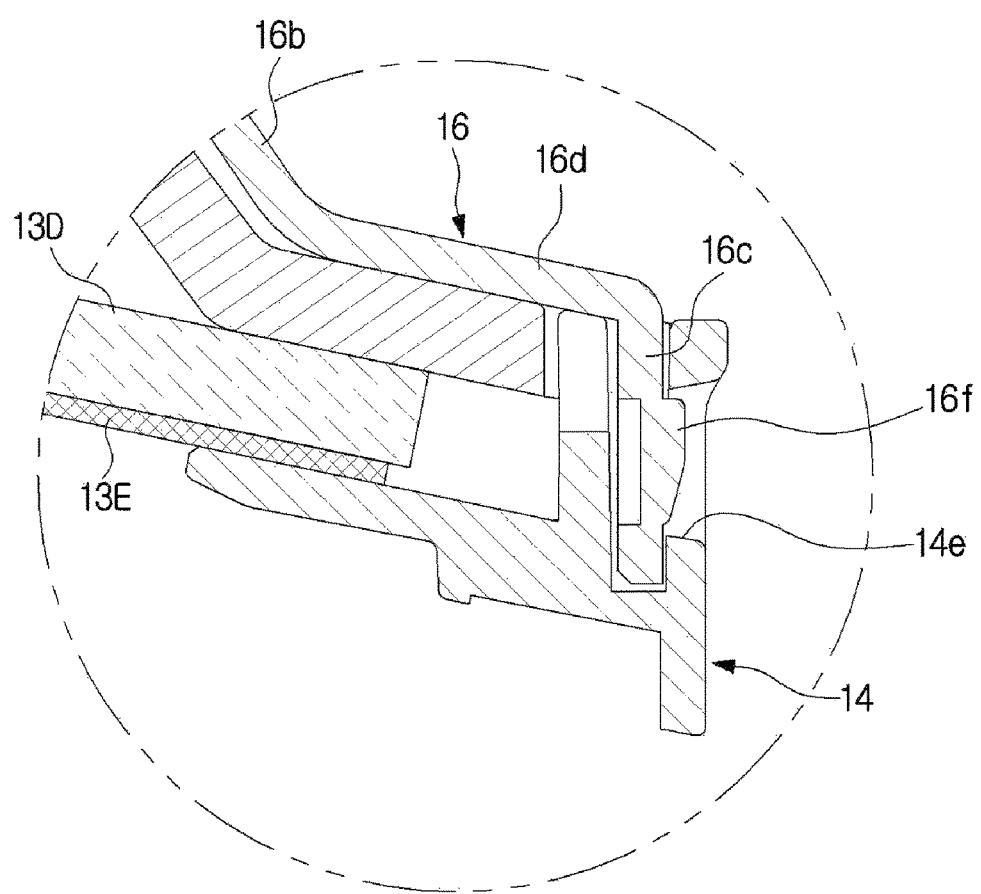
FIG. 22 is a cross-sectional view showing a coupling of the middle mold and the bottom chassis.

In addition, as illustrated in FIG. 20, FIG. 21, and FIG. 22, a rear side of the middle mold 14 is provided with the bottom chassis 16 coupled thereto. In this aspect, the middle mold 14 is provided with hooking holes 14e formed therein along the outer sides of the middle mold 14, and the bottom chassis 16 is provided with hooking protrusions 16f at which the hooking holes 14e are hooked.

As described above, a display apparatus in accordance with one or more exemplary embodiments is provided with a quantum dot sheet supported by use of a middle holder and optical sheets supported by use of a middle mold, and thus the quantum dot sheet and the optical sheets may be disposed at an inside of the display apparatus while in a state of being spaced apart with respect to each other.

In addition, a display apparatus in accordance with one or more exemplary embodiments is provided with a diffusion sheet disposed at a front side of a mounting portion of a middle mold which supports a display panel, and thus the effective area of the display panel at which a screen is disposed may be increased so as to correspond to the diffusion sheet.

A display apparatus, comprising a display panel 11 which is curvedly bent such that respective side portions of the display panel 11 are protruded forward with respect to a central vertical axis of the display panel 11, a backlight 12 disposed at a rear side of the display panel 11 and configured to supply light to the display panel 11, a quantum dot sheet 13E disposed at a front side of the backlight 12 and configured to generate fluorescence with respect to the light supplied by the backlight 12.

The quantum dot sheet 13E includes a plurality of quantum dots, wherein each of the plurality of quantum dots is composed of one from among cadmium selenide, cadmium sulfide, cadmium telluride, zinc selenide, zinc sulfide, and zinc telluride.

The backlight 12 includes a light source board 122 a plurality of light-emitting diodes 121 which are disposed on the light source board 122, wherein each of the plurality of light-emitting diodes 121 is configured to emit blue light.

The display apparatus further comprising a middle mold 14 configured to support an outer side of the display panel 11; and at least one optical sheet disposed at a front side of the quantum dot sheet and being spaced apart from the quantum dot sheet, wherein the at least one optical sheet 13E comprises a diffusion sheet 13A configured to diffuse light received from a rear side of the at least one optical sheet.

The display apparatus further comprising a bottom chassis 16 configured to accommodate the backlight 12; and a middle holder 17 installed in the bottom chassis 16 and configured to support an outer side of the quantum dot sheet 13E, wherein the middle holder 17 comprises a reflective portion 17c which is configured to reflect light received from the backlight 12 in a forward direction, and a board supporting portion 17d which extends from a rear end portion of the reflective portion 17c and is configured to support an outer side of a light source board 122 included in the backlight 12.

Although a few exemplary embodiments have been shown and described, it will be appreciated by those of ordinary skill in the art that changes may be made in these exemplary embodiments without departing from the principles and spirit of the present inventive concept, the scope of which is defined in the claims and their equivalents.

What is claimed is:

1. A display apparatus, comprising:
a display panel,
a backlight disposed at a rear side of the display panel,
a quantum dot sheet disposed at a front side of the backlight,
a bottom chassis configured to accommodate the backlight, and
a middle holder installed in the bottom chassis and configured to support outer sides of the backlight and outer sides of the quantum dot sheet.

2. The display apparatus of claim 1, wherein:
the middle holder comprises a holder frame portion, and at least one quantum dot sheet supporting protrusion which protrudes forward from the holder frame portion and at which the quantum dot sheet is hooked and supported, and
the quantum dot sheet comprises at least one quantum dot sheet supporting hole at which a corresponding one from among the at least one quantum dot sheet supporting protrusion is inserted and hooked.

3. The display apparatus of claim 2, wherein:
the quantum dot sheet comprises at least one quantum dot sheet supporting portion which extends from an outer side end portion and which is provided with a corresponding one from among the at least one quantum dot sheet supporting hole.

4. The display apparatus of claim 1, further comprising:
a diffusion member disposed at a front side of the backlight,
wherein a rear surface of the quantum dot sheet is supported at a front surface of the diffusion member.

5. The display apparatus of claim 1, wherein:
the backlight comprises a light source board disposed at a front surface of the bottom chassis, and a plurality of light-emitting diodes disposed on the light source board and configured to radiate light toward a rear surface of the display panel, and
the middle holder comprises a board supporting portion configured to support at least one outer side of the light source board.

6. The display apparatus of claim 5, wherein:
each of the plurality of light-emitting diodes is formed by using a respective blue light-emitting diode configured to generate blue light, and
the quantum dot sheet is formed by using a yellow color.

7. The display apparatus of claim 1, further comprising:
a middle mold configured to support an outer side of the display panel; and
at least one optical sheet disposed at a front side of the quantum dot sheet and being spaced apart from the quantum dot sheet.

8. The display apparatus of claim 7, wherein:
the middle mold comprises a mold frame portion to which the bottom chassis is coupled, a panel supporting portion which extends inward from the mold frame portion and which is configured to support the display panel, and an optical sheet accommodating portion which extends inward from the panel supporting portion and forms a step and is configured to accommodate the at least one optical sheet.

9. The display apparatus of claim 7, wherein:
the at least one optical sheet comprises a diffusion sheet configured to diffuse light received from a rear side of the at least one optical sheet.

10. The display apparatus of claim 4, wherein:
each of the display panel, the diffusion member, and the quantum dot sheet is curvedly bent such that respective side portions thereof are protruded forward with respect to a center portion of the display apparatus.

11. The display apparatus of claim 2, wherein:
the middle holder further comprises a reflective portion which is inclined with respect to the holder frame portion and extends from the holder frame portion in a rearward direction and is configured to reflect light received from the backlight in a forward direction, and
a board supporting portion which extends from a rear end portion of the reflective portion and is configured to support an outer side of a light source board included in the backlight.

12. A display apparatus, comprising:
a display panel,
a backlight disposed at a rear side of the display panel,
a middle mold configured to support the display panel, and
a diffusion sheet disposed at a front side of the backlight, wherein
the middle mold is disposed between the backlight and the diffusion sheet, and
the middle mold comprises a panel supporting portion configured to support an outer side of a rear surface of the display panel and an optical sheet accommodating portion which extends inward from the panel supporting portion and forms a step and is configured to accommodate the diffusion sheet.

13. The display apparatus of claim 12, further comprising:
a diffusion member which is disposed at a front side of the backlight and which is formed in a shape of a panel, and a quantum dot sheet which includes a rear surface thereof that is supported at a front surface of the diffusion member,
wherein the diffusion sheet is disposed at a front side of the quantum dot sheet and is spaced apart from the quantum dot sheet.

14. The display apparatus of claim 13, further comprising:
a bottom chassis coupled to a rear of the middle mold and configured to accommodate the backlight,
wherein the backlight comprises a light source board disposed at a front surface of the bottom chassis, and a plurality of light-emitting diodes disposed on the light source board and configured to radiate light toward a rear surface of the display panel.

15. The display apparatus of claim 14, further comprising:
a middle holder installed in the bottom chassis and configured to support at least one outer side of the light source board,
wherein the middle holder comprises a holder frame portion, at least one sheet supporting protrusion which protrudes forward from the holder frame portion and is configured to support the quantum dot sheet, and a board supporting portion configured to support the at least one outer side of the light source board, and
the quantum dot sheet comprises a quantum dot sheet supporting portion which extends from an outer side end portion of the quantum dot sheet, and at least one quantum dot sheet supporting hole provided at the quantum dot sheet supporting portion and at which a corresponding one from among the at least one sheet supporting protrusion is installed.

16. A display apparatus, comprising:
a display panel;
at least one optical sheet disposed at a rear side of the display panel;
a middle mold configured to support at least one outer side of the display panel and the at least one optical sheet;
a backlight disposed at a rear side of the display panel;
a quantum dot sheet disposed at a front side of the backlight and disposed at a rear side of the at least one optical sheet and being spaced apart from the at least one optical sheet,
a bottom chassis configured to accommodate the backlight, and
a middle holder installed in the bottom chassis and configured to support outer sides of the backlight and outer sides of the quantum dot sheet.

17. The display apparatus of claim 16, wherein:
the middle mold comprises a panel supporting portion configured to support the display panel, and an optical sheet accommodating portion which extends inward from the panel supporting portion and forms a step and is configured to accommodate the at least one optical sheet.

18. The display apparatus of claim 16, wherein:
the middle holder comprises a holder frame portion, and at least one quantum dot sheet supporting protrusion which protrudes forward from the holder frame portion and at which the quantum dot sheet is hooked and supported, and
the quantum dot sheet comprises at least one quantum dot sheet supporting hole at which a corresponding one from among the at least one quantum dot sheet supporting protrusion is inserted and supported.

19. The display apparatus of claim 16, wherein:
the at least one optical sheet comprises a diffusion sheet configured to diffuse light received from a rear side of the at least one optical sheet.

* * * * *